US 8,086,326 B2

(12) United States Patent
Laursen et al.

(10) Patent No.: US 8,086,326 B2
(45) Date of Patent: Dec. 27, 2011

(54) FAIL-SAFE SYSTEM FOR CONTROLLING WIND TURBINES

(75) Inventors: Michael Laursen, Odense SV (DK); Flemming Bay Thunbo, Galten (DK)

(73) Assignee: Siemens Aktiengesellschaft, Munich (DE)

( * ) Notice: Subject to any disclaimer, the term of this patent is extended or adjusted under 35 U.S.C. 154(b) by 434 days.

(21) Appl. No.: 12/319,491

(22) Filed: Jan. 8, 2009

(65) Prior Publication Data

US 2009/0187283 A1   Jul. 23, 2009

(30) Foreign Application Priority Data

Jan. 21, 2008   (EP) ..................... 08001065

(51) Int. Cl.
G05B 11/01 (2006.01)
G05D 3/12 (2006.01)
G05D 5/00 (2006.01)
G05D 9/00 (2006.01)
G05D 11/00 (2006.01)
G05D 17/00 (2006.01)
F03D 9/00 (2006.01)
H02P 9/04 (2006.01)

(52) U.S. Cl. ............ 700/19; 700/20; 700/286; 700/287; 290/44; 290/55

(58) Field of Classification Search .............. 700/19–20, 700/286–287; 290/44, 55
See application file for complete search history.

(56) References Cited

U.S. PATENT DOCUMENTS

| 6,925,385 | B2 * | 8/2005 | Ghosh et al. ................... 702/14 |
| 7,274,305 | B1 * | 9/2007 | Luttrell .................... 340/870.02 |
| 7,346,462 | B2 * | 3/2008 | Delmerico ...................... 702/60 |
| 7,745,948 | B2 * | 6/2010 | Kerber .......................... 290/44 |
| 7,840,312 | B2 * | 11/2010 | Altemark et al. ............. 700/286 |
| 7,876,260 | B2 * | 1/2011 | Laufer ............................ 342/61 |
| 7,895,016 | B2 * | 2/2011 | Vittal et al. ................... 702/184 |
| 7,979,167 | B2 * | 7/2011 | Delmerico et al. ........... 700/291 |
| 2002/0029097 | A1 * | 3/2002 | Pionzio et al. ............... 700/286 |
| 2005/0090937 | A1 * | 4/2005 | Moore et al. ................. 700/286 |
| 2005/0194787 | A1 | 9/2005 | Tilscher et al. |
| 2006/0100748 | A1 | 5/2006 | Schubert |
| 2006/0214428 | A1 | 9/2006 | Altemark et al. |
| 2006/0273595 | A1 * | 12/2006 | Avagliano et al. ............. 290/44 |
| 2009/0281675 | A1 * | 11/2009 | Rasmussen et al. .......... 700/287 |
| 2010/0133815 | A1 * | 6/2010 | Middendorf et al. .......... 290/44 |
| 2010/0262308 | A1 * | 10/2010 | Anderson et al. ............. 700/287 |

(Continued)

FOREIGN PATENT DOCUMENTS

EP   1752660 A1   2/2007

OTHER PUBLICATIONS

U.S. Appl. No. 60/950,223; filed by Eric D Laufer; 11 pages; filed on Jul. 17, 2007.*
Hsiung Cheng Lin: "Web-Based Remote Online Maximum Wind Power Monitoring and Control System", Computer Applications in Engineering Education, vol. 15, No. 2, Jul. 24, 2007, pp. 155-165, XP002498131; Others.

*Primary Examiner* — Ronald Hartman, Jr.

(57) ABSTRACT

A wind turbine control system is provided. The control system includes a first and a second control unit which are coupled to each other over a first network. The first control unit is configured as a critical control unit, comprising a first set of functions comprising critical control functions for the operation of a wind turbine, and the second control unit is configured as a secondary control unit, comprising a second set of functions comprising non-critical control functions and data management functions.

17 Claims, 2 Drawing Sheets

U.S. PATENT DOCUMENTS

2010/0280673 A1* 11/2010 Woste ............................ 700/287
2010/0318233 A1* 12/2010 Yunes et al. .................. 700/287
2011/0020122 A1* 1/2011 Parthasarathy et al. ......... 416/61
2011/0049903 A1* 3/2011 Jorgensen et al. .............. 290/55

* cited by examiner

FAIL-SAFE SYSTEM FOR CONTROLLING WIND TURBINES

CROSS REFERENCE TO RELATED APPLICATIONS

This application claims priority of European Patent Office application No. 08001065.5 EP filed Jan. 21, 2008, which is incorporated by reference herein in its entirety.

FIELD OF INVENTION

The invention relates to a wind turbine control system with at least a first and a second control unit coupled to each other over a first network.

BACKGROUND OF INVENTION

When operating wind turbines, for instance in complex arrangements such as wind turbine parks, it is desirable to ensure a maximum of error-free operation. Thus, down times due to system faults need to be minimized, and also the time and effort necessary for maintenance and repair is to be kept as low as possible.

For ensuring error-free operation, systems designed according to the safe-life-approach are known in the art, for instance in aircraft design. Here, each particular component in the system is provided with a guaranteed life-time, after which the respective component is to be exchanged—the guaranteed life-time of a component being much lower than its actual life-time. While this approach provides for a very high reliability when the system is used, it requires a significant amount of maintenance, and thus, downtime. When, however, trying to reduce maintenance efforts, for instance by providing the system components with the highest possible life-time, the components need to be even further overdimensioned, so that the overall technical effort remains very high.

Another approach is known from published patent application US 2006/0100748 A1. Here a number of sensor/actor units is integrated with its respective control unit, so that the overall wind turbine control is modularized and each module is tightly coupled to its respective functional group. Consequently, when a first sensor/actor/control module becomes defective (or obsolete), it can be exchanged (or updated) without having to touch the remaining sensor/actor/control modules. Further, such a solution provides fail-safety features in view of fault isolation and fault containment. Regarding fault isolation, such a modularization enables proper identification of the faulty control module. Regarding fault containment, it potentially inhibits a control module failure (for instance, an electrical failure) from affecting further modules. A specific module of a first vendor could generally be exchanged for one of another vendor, without having to alter the remaining modules.

SUMMARY OF INVENTION

However, due to the functional separation of such a control system, much technical effort is spent on redundant features which are necessary in each of the modules, without significantly profiting from that redundancy in terms of increased fault tolerance. For instance, signal processing means in module A may be of the same type as in module B, however, the signal processing means of module B can not take over the signal processing of module A in case module A fails. Moreover, in order to achieve a maximum of uninterrupted uptime, each of the modules associated to the various functions have to be dimensioned to provide a high life-time, resulting in high cost and technical effort.

It is therefore an object of the present invention to provide a wind turbine control system that provides improved stability upon failure of control components while enabling to reduce the maintenance frequency in a technically economical manner.

This object is achieved by the subject of the claims.

In one aspect, the invention teaches a wind turbine control system with at least a first and a second control unit coupled to each other over a first network, characterized in that the first control unit is configured as a critical control unit, comprising a first set of functions comprising critical control functions for the operation of a wind turbine; the second control unit is configured as a secondary control unit, comprising a second set of functions comprising non-critical control functions and data management functions.

By concentrating the critical control functions at the critical control unit, the overall probability of harmful system failure is reduced as compared to systems where each of a plurality of control modules comprises functions that are critical to the wind turbine. Such critical functions may comprise functions that are necessary to avoid mechanical or electrical damages to the wind turbine or elementary user interface functions for influencing the wind turbine by an operator.

By concentrating, at the same time, non-critical control functions to a second control unit, it is provided to keep the critical control unit as free as possible from computational load of non-critical processes. First, the risk of a non-critical process interfering with a critical process and thereby causing a failure of the critical control functions is thus minimized. Second, computational capacity of the critical unit, which may run on a high-reliability subsystem and thus may be more expensive, is saved. Examples of such non-critical functions that, however, produce high computational load are the logging of measurement data, or providing advanced user-interface functions such as through a web server.

Moreover, with the present invention, redundant technical components that do not significantly serve to improve system reliability are avoided.

The invention can be embodied according to the features provided in the dependent claims.

In an embodiment, the mean time between failures of the first control unit is larger than the mean time between failures of the second control unit, thus making use of the technically efficient concentration of critical functions to the first control unit. While particularly reliable hard- and software may be used for the first unit, universal-purpose standard computing platforms, for instance for embedded systems, may be used for the second unit.

Further, control functions of the first set may also be redundantly included in the second set, to provide graceful degradation within the overall control system.

In an embodiment, the first control unit is configured to satisfy real-time conditions. This may include using a real-time operating system and using appropriate software and hardware components to provide the critical control functions.

In order to avoid the use of rotating parts or parts that are subject to mechanical wear in another respect, the first control unit can be embodied to comprise a solid-state data store and may be configured to use the solid-state data store as a mass data storage. Such solid-state data store may comprise a solid state disc and/or a compact flash card.

In an embodiment, the data management functions comprise logging and/or retrieving data collected from the first control unit. Further, the second set of functions to be provided by the second control unit may comprise user interface functions, such as servicing hypertext transfer protocol requests by a web server. In contrast to the basic user interface functions embodied in the critical control unit, the user interface functions embodied in the second unit are more advanced and provide further data access and analysis in a conveniently accessible form.

For providing access to components that are external to the control system and its interface to the wind turbine, the second control unit may be coupled to a second network. Thus, a failure in the second network does not afflict communication on the first network. To even reduce the risk of failures in the second network, it can be embodied as an optical communication network. The second network can comprise a local area network and/or a wide area network and/or at least one virtual local area network.

If the the first control unit is coupled to the second network as well and the critical control functions comprise providing an interface for operating the turbine, a redundant user access point is provided through which an external operator or control system can influence the wind turbine.

Generally, the critical control functions can comprise one or more of the following functions:
execute critical application software for controlling the wind turbine;
communicate with sensors/actors of the wind turbine;
provide measurement data over an interface;
act as a controller device in the first network.

In order to meet real-time requirements on the network communication level as well, the first and/or second network may comprise a process data network

BRIEF DESCRIPTION OF THE DRAWINGS

The invention and its embodiments are explained in more detail below, using the following figures.

DETAILED DESCRIPTION OF INVENTION

Figure 1:
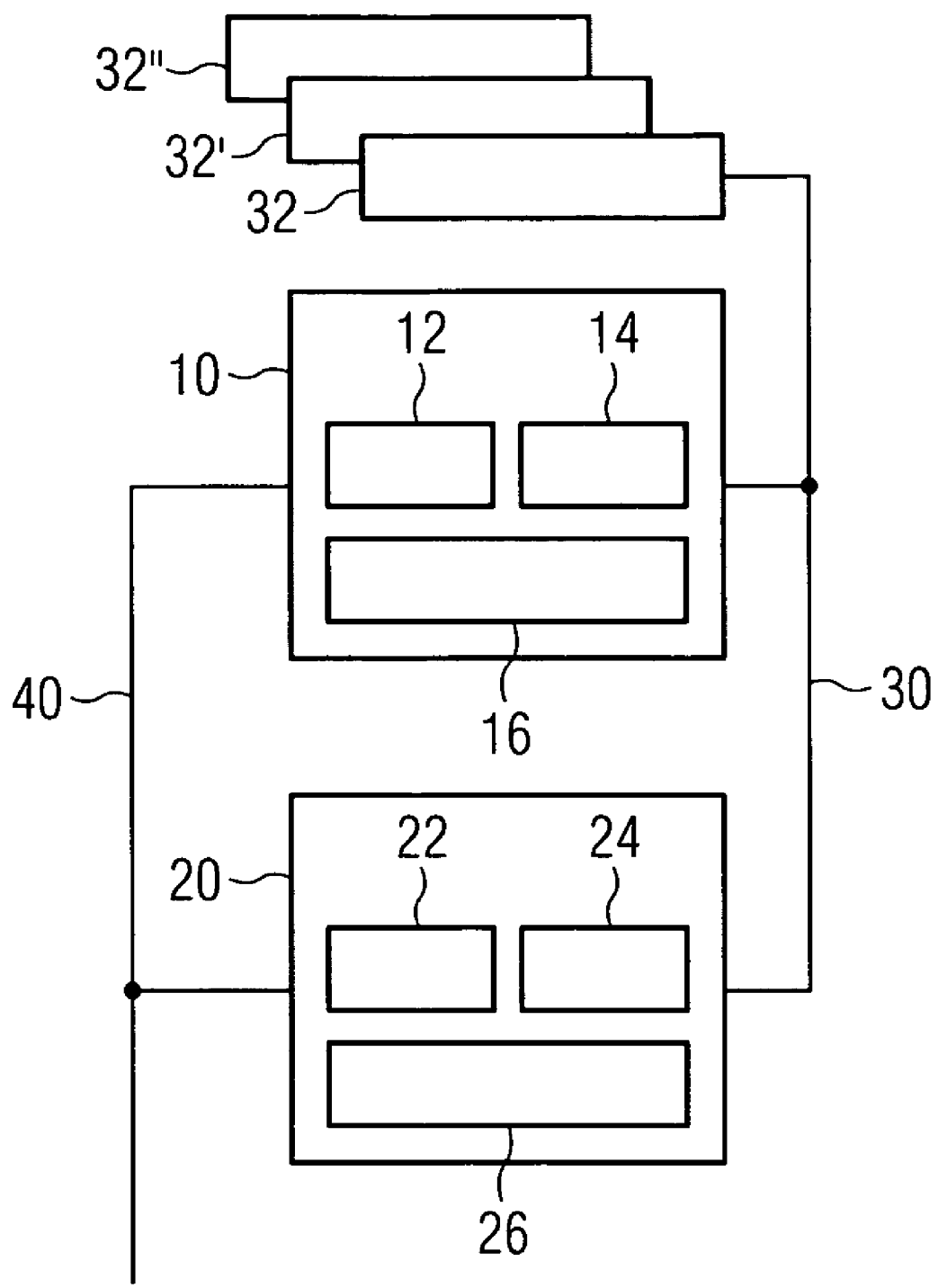
FIG. 1 shows a schematic overview of an embodiment of the invention.

FIG. 1 shows a schematic overview of an embodiment of the proposed wind turbine control system. A critical control unit 10 comprises a set of critical control functions 12, a solid state disk 14 as mass storage and operates on a real-time system platform 16 comprised in the unit. Critical control unit 10 is connected to secondary control unit 20 via process data network 30. Secondary control unit 20 comprises a set of non-critical control functions 22, a computer hard disk 24 as mass storage and a standard embedded system platform 26.

I/O stations 32, 32', 32" are connected to process data network 30 to communicate to critical control unit 10 and secondary control unit 20. These I/O stations may be different kinds of passive distributed I/O stations (e.g. standard digital and analog I/O), or intelligent units performing special functions (e.g. grid monitoring or pitch control). For example, two possible custom designed units may be present among the I/O stations, namely a hub computer and a G-sensor module (accelerometer module). The hub computer would be present to be able to interface to the pitch system of the wind turbine's rotor. The G-sensor would, for example, be included on the hub computer to provide additional signals used in the pitch system. Such signals would represent motions of the wind turbine's tower. Alternatively to putting the G-sensor in the hub, the G-sensor could be placed in the nacelle or the tower. Further possible I/O stations may be a grid measuring and controlling module, a converter complising a generator inverter and a grid inverter, etc. Both critical control unit 10 and secondary control unit 20 are further connected to external network 40.

Critical control unit 10 performs all control functions that are critical to the operation of the turbine. This particularly comprises such functions that prevent damage to the otherwise uncontrolled turbine. The critical control unit runs application software that is considered to be of primary importance for wind turbine operation, performs the actual controlling via distributed I/O stations 32, 32', 32" and possibly further distributed intelligent control units, provides a primary interface for influencing the wind turbine by an external operator or other system components over networks 30 and/or 40, provides an interface for providing measurement data (and other) to other system components over networks 30 and/or 40, and acts as a controller device (master device) in the process data network 30.

The critical control unit uses flash-based memory 14 as a mass storage device, such as a Compact Flash-card or any type of solid state disk. Optionally, it may be equipped with a redundant array of independent disks (RAID). The real-time system platform 16 is based on an Intel processor with corresponding BIOS-operated main board architecture in connection with a real-time operating system such as the QNX system. In order to connect to process data network 30, control unit 10 is equipped with a PROFINET IRT controller. Further, an Ethernet controller located in the unit serves to connect to external network 40. Heat-generating elements in the unit are passively cooled in order to fully avoid the use of moving or rotating parts in the system.

Thus, the reliability of critical control unit 10 is enhanced by avoiding mechanical wear, and at the same time, concentrating all critical control functions in this unit while keeping it free from secondary control functions and secondary software applications, and the unit is enabled to match the real-time requirements induced by its control tasks. Due to the focus of functionality provided in this unit, its reliability can be enhanced in a particularly effective manner by using parts with greater guaranteed life time only for critical functions.

Secondary control unit 20, on the other hand, uses relatively inexpensive processor and mass-storage devices (for instance, RAID), so that comparatively large calculating capacity can be provided at low cost. Secondary control unit 20 can further run a variety of secondary software applications without the risk of interfering with critical control functions, or overloading the critical control unit. In order to reduce the negative effects of vibrations in the wind turbine setting, the secondary control unit 20 can be located at the tower base of a wind turbine. As embedded platform, Windows XP Embedded can be used on a standard Intel architecture. Secondary control unit 20 can provide data management functions such as collecting data from critical control unit 10 and storing, retrieving and processing them, as well as advanced user interface functions through a web server.

If certain critical functions of the critical control unit 10 are embodied in secondary control unit 20 as well, so that the secondary control unit can take over certain critical functions in case of failure of the critical control unit, the system provides additional fault-tolerance and graceful degradation.

Internal network 30 is an industrial standard processing network (field bus) and is of high bandwidth, so that the life span of the network is not compromised due to bandwidth resources becoming too small. Industrial standard components used throughout the present embodiments can be maintained relatively quickly and easily. Further, the field bus system may interface to other field bus systems via bus couplers, so that a high degree of scalability is achieved. Internal network 30 provides the bandwidth to carry the total system busload while providing real-time capabilities. In configurations where critical control functions are not embodied in the secondary unit as well, for providing fault tolerant takeover, it is sufficient to only connect critical control unit 10 with the I/O stations. Where such takeover is implemented, secondary unit 20 is connected to the process network as well.

I/O stations 32, 32', 32" provide interfaces with transducers and actuators in the wind turbine. In the system, different types of I/O stations can be used, depending on the particular needs of interfacing with the respective sensor/actor.

External network 40 is an Ethernet network and provides external access to wind turbine control system and other components within the wind turbine. The external network may extend across an entire wind turbine park and can be of any network topology. Since both critical control unit 10 and secondary control unit 20 are connected to the external network, a redundant network access point is provided, so that both of the control units can always be reached, also in case one of the control units fails. By separating the external network from the internal network, errors in one of the networks will not propagate through the entire system and will thus not adversely effect components in the other network. For instance, high network traffic on the external network will not congest the internal network. External network can be implemented as an optical Ethernet, so that a reliable and economical connection is provided which is immune to electrical influence, such as lightning.

Figure 2:
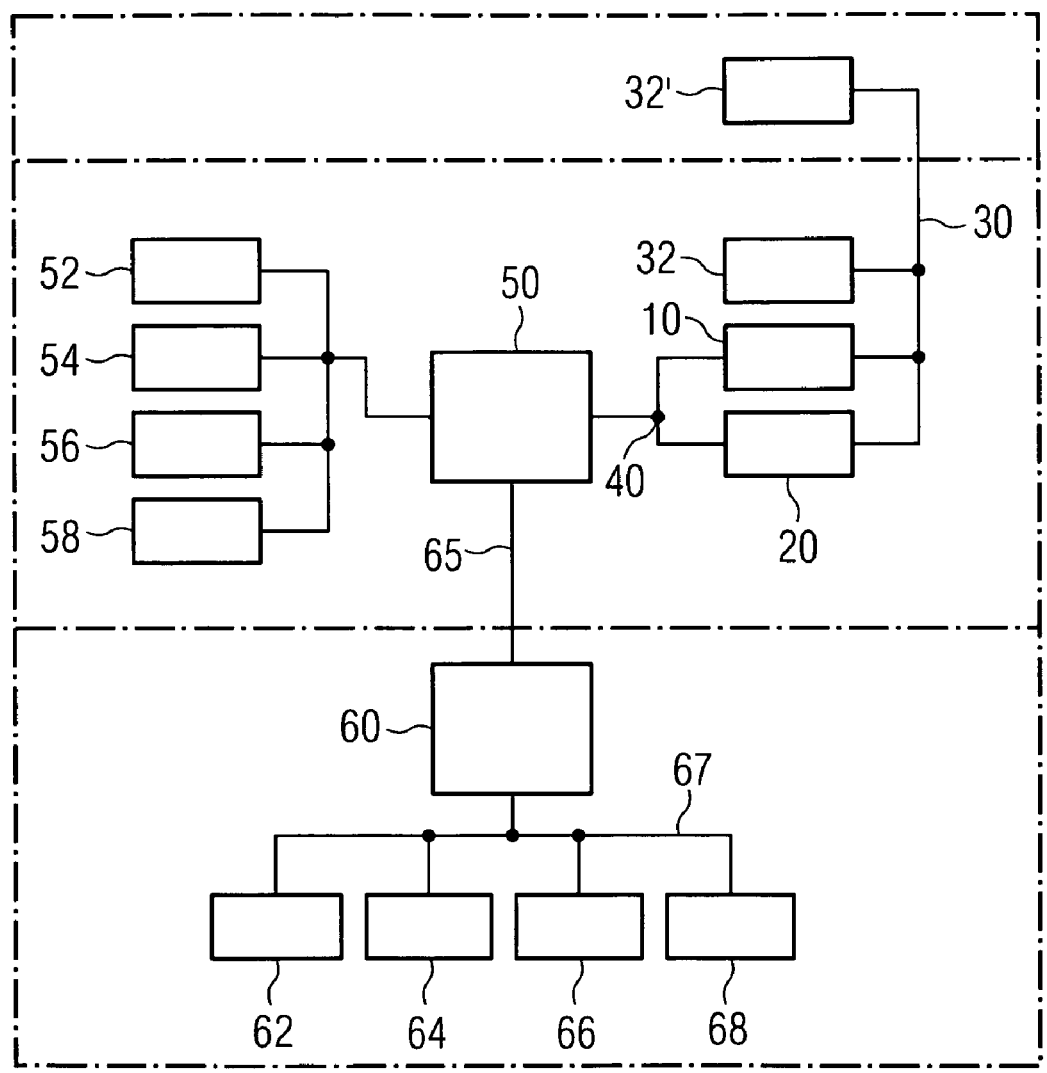
FIG. 2 shows a schematic overview of the system environment in which the embodiment is deployed.

FIG. 2 shows a schematic overview of the system environment in which the embodiment is deployed. Reference numerals identical to those in FIG. 1 refer to identical elements. Thus, critical control unit 10, secondary control unit 20, I/O stations 32 and 32' are connected via internal process network 30, and critical control unit 10 and secondary control unit 20 both are connected to external network 40, as shown in FIG. 1. Control units 10 and 20, as well as I/O station 32, are located at the wind turbine tower base, while I/O station 32' is located at the wind turbine nacelle.

External network 40 comprises a first portion to connect the control units as well as IP Phone 52, TCM Server 54 (TCM: Wind Turbine Condtion Monitoring Sytem), and customer units 56 and 58 with a virtual local area network (VLAN) switch 50. The VLAN switch serves to separate the network traffic into a number of logically independent networks, so that network security and performance are enhanced. VLAN switch 50 is connected to VLAN switch 60 over a second portion of the external network, i.e. wind farm network 65. A third portion of the external network is embodied by outside connecting networks 67, which may comprise internet, customer intranets, and non-real time administrative networks of the wind turbine park, respectively used to connect the wind turbine devices to customer site 62, system operator site 64, wind turbine park server 66, and wind turbine park pilot 68.

The embodiment described herein thus provides a fail-safe and fault-tolerant wind turbine control system that ensures safe and fast operation and which is, at the same time, easy to maintain, upgrade and upscale. It provides for easy connection to internal and external controllers and devices.

The invention claimed is:

1. A wind turbine control system, comprising:
   a first control unit and a second control unit coupled to each other over a first network,
   wherein the first control unit is configured as a critical control unit, comprising a first set of functions comprising critical control functions for the operation of a wind turbine, and
   wherein the second control unit is configured as a secondary control unit, comprising a second set of functions comprising non-critical control functions and data management functions,
   wherein a mean time between failures of the first control unit is larger than a mean time between failures of the second control unit.

2. The system according to claim 1, wherein the first control unit is configured to satisfy real-time conditions.

3. The system according to claim 1, wherein the first control unit comprises a real-time operating system.

4. The system according to claim 1, wherein the first control unit comprises a solid-state data store and is configured to use the solid-state data store as a mass data storage.

5. The system according to claim 4, wherein the solid-state data store comprises a solid state disc or a compact flash card.

6. The system according to claim 4, wherein the solid-state data store comprises a solid state disc or a compact flash card.

7. The system according to claim 1, wherein the data management functions comprises logging and retrieving data collected from the first control unit.

8. The system according to claim 1, wherein the data management functions comprises logging or retrieving data collected from the first control unit.

9. The system according to claim 1, wherein the second set of functions comprises user interface functions.

10. The system according to claim 9, wherein the user interface functions comprise servicing hypertext transfer protocol requests.

11. The system according to claim 1, wherein the second control unit is coupled to a second network.

12. The system according to claim 11, wherein the second network is an optical communication network.

13. The system according to claim 11, wherein the second network comprises a local area network and/or a wide area network and/or at least one virtual local area network.

14. The system according to claim 11, wherein the first control unit is coupled to the second network and the critical control functions comprise providing an interface for operating the turbine.

15. The system according to claim 1, wherein the critical control functions comprise at least one function selected from the group consisting of
   executing critical application software for controlling the wind turbine,
   communicating with sensors and/or actuators of the wind turbine,
   providing measurement data over an interface, or
   acting as a controller device in the first network.

16. The system according to claim 1, wherein the first or second network comprise a process data network.

17. The system according to claim 1, wherein the first and second network comprise a process data network.

* * * * *